3,064,008
EPSILON-CAPROLACTONES AND PROCESS FOR
PREPARING THE SAME
Benjamin Phillips and Paul S. Starcher, Charleston, W.
Va., assignors to Union Carbide Corporation, a corporation of New York
No Drawing. Continuation of application Ser. No.
548,754, Nov. 23, 1955. This application Feb. 17,
1960, Ser. No. 9,165
14 Claims. (Cl. 260—343)

This application is a continuation of Serial No. 548,754 filed Nov. 23, 1955, now abandoned.

The present invention is related to epsilon-caprolactones and to a process for the production of epsilon-caprolactones. More particularly, this invention is directed to certain alkyl-substituted-epsilon-caprolactones as new compounds and to a process for the production of epsilon-caprolactones as a class which comprises reacting a cyclohexanone of the class consisting of cyclohexanone and alkyl-substituted cyclohexanones and an oxidizing agent selected from the class consisting of acetaldehyde monoperacetate and peracetic acid.

One of the particular objects of this invention is to provide a process for the production of epsilon-caprolactones of high purity in substantially monomeric form which maintains a high degree of stability when stored for any length of time at room temperatures. Another object of this invention resides in provision that an epsilon-caprolactone is produced in a monomeric form with the substantial exclusion of the product of polymerization of epsilon-caprolactones. It has been found that certain novel alkyl-substituted-epsilon-caprolactones made by the process of this invention are outstandingly useful in the production of polyester gum stocks and cured elastomers which are superior to conventional polyester gum stocks and elastomers. These compounds also have outstanding utility for the production of epsilon halo-caproic acids as described and claimed in our copending application Serial No. 548,753, filed November 23, 1955, matured to U.S. 2,839,576.

The certain alkyl-substituted epsilon-caprolactones which have been found to be particularly suitable in the preparation of polyester gum stocks and cured elastomers, are characterized by the following general formula:

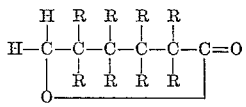

where at least one and no more than four of the R's represent alkyl groups, the remainder being hydrogen atoms and the total number of carbon atoms in the alkyl groups does not exceed twelve.

Among the alkyl-substituted epsilon-caprolactones within the scope of this invention are:

Alpha-methyl-epsilon-caprolactone;
Beta-methyl-epsilon-caprolactone;
Gamma-methyl-epsilon-caprolactone;
Delta-methyl-epsilon-caprolactone;
Alpha-ethyl-epsilon-caprolactone;
Beta-ethyl-epsilon-caprolactone;
Gamma-ethyl-epsilon-caprolactone;
Delta-ethyl-epsilon-caprolactone;
Alpha,beta-dimethyl-epsilon-caprolactone;
Alpha,gamma-dimethyl-epsilon-caprolactone;
Alpha,delta-dimethyl-epsilon-caprolactone;
Beta,gamma-dimethyl-epsilon-caprolactone;
Beta,delta-dimethyl-epsilon-caprolactone;
Gamma,delta-dimethyl-epsilon-caprolactone;
Beta,beta,delta-trimethyl-epsilon-caprolactone;
Beta,delta,delta-trimethyl-epsilon-caprolactone;
Alpha,beta,gamma-trimethyl-epsilon-caprolactone;
Alpha,beta,delta-trimethyl-epsilon-caprolactone;
Beta,gamma,delta-trimethyl-epsilon-caprolactone;
Alpha-ethyl-beta-methyl-epsilon-caprolactone;
Alpha-ethyl-gamma-methyl-epsilon-caprolactone;
Alpha-ethyl-delta-methyl-epsilon-caprolactone;
Beta-ethyl-alpha-methyl-epsilon-caprolactone;
Beta-ethyl-gamma-methyl-epsilon-caprolactone;
Beta-ethyl-delta-methyl-epsilon-caprolactone;
Gamma-ethyl-alpha-methyl-epsilon-caprolactone;
Gamma-ethyl-beta-methyl-epsilon-caprolactone;
Gamma-ethyl-delta-methyl-epsilon-caprolactone;
Delta-ethyl-alpha-methyl-epsilon-caprolactone;
Delta-ethyl-beta-methyl-epsilon-caprolactone;
Delta-ethyl-gamma-methyl-epsilon-caprolactone;
Alpha,alpha-dimethyl-epsilon-caprolactone;
Beta,beta-dimethyl-epsilon-caprolactone;
Gamma,gamma-dimethyl-epsilon-caprolactone;
Delta,delta-dimethyl-epsilon-caprolactone;
Alpha,alpha,delta-trimethyl-epsilon-caprolactone;
Beta,beta,gamma-trimethyl-epsilon-caprolactone;
Alpha,delta,delta-trimethyl-epsilon-caprolactone;
Beta,beta-dimethyl-gamma-ethyl-epsilon-caprolactone;
Delta,delta-dimethyl-alpha-ethyl-epsilon-caprolactone.

Still other alkyl-substituted epsilon-caprolactones can be produced wherein the alkyl substitutent can be, for example, propyl, isopropyl, butyl, isobutyl, tertiary, butyl, amyl, isoamyl, hexyl, heptyl, octyl, nonyl, decyl, undecyl and dodecyl groups. Typical representative compounds containing higher alkyl groups are gamma-isopropyl-epsilon-caprolactone, gamma-(2-ethylhexyl)-epsilon-caprolactone.

The process of this invention provides for the production of epsilon-caprolactones in substantially monomeric form which comprises reacting a cyclohexanone of the group consisting of cyclohexanone and alkyl-substituted cyclohexanones and an oxidizing agent selected from the group consisting of acetaldehyde monoperacetate and peracetic acid.

Although some mention of epsilon-caprolactone produced by the direct oxidation of cyclohexanone is found in the literature the products of the methods heretofore suggested appear to have been contaminated by the presence of polymeric materials as far as is known. Early attempts to prepare epsilon-caprolactones by treatment of cyclohexanone with various reagents such as Caro's acid, pernitric acid, and the like resulted in the production of compounds such as cyclohexylidenecyclohexanone or non-distillable viscous oils. Epsilon-caprolactone of high purity has been prepared by a different route by Carothers et al., Jour. Am. Chem. Soc. 56, 455 (1934) who cyclized 6-hydroxycaproic acid, obtained by partial reduction of diethyl adipate, under mild conditions and high vacuum in 64 per cent yield. The product, epsilon-caprolactone, was stable when stored at room temperatures when made in this fashion.

One of the outstanding advantages of the products made by the process of this invention, apart from the usefulness of certain of the alkyl-substituted epsilon-caprolactones, is that the products thus produced are substantially monomeric epsilon-caprolactones which are stable on standing. For example, an epsilon-caprolactone was prepared in accordance with the process of this invention and had a refractive index $(n_D{}^{30})$ of 1.4600. After an extended period of about one year, the refractive index of the product was measured and found to be 1.4604 and 1.4592, as measured by two different refractometers. Such close agreement of the refractive indices indicates that the product had not polymerized on standing.

The reaction between a cyclohexanone and oxidizing agent is carried out under conditions which can vary to a great extent. The reaction can be illustrated by the following equation using peracetic acid as illustrative:

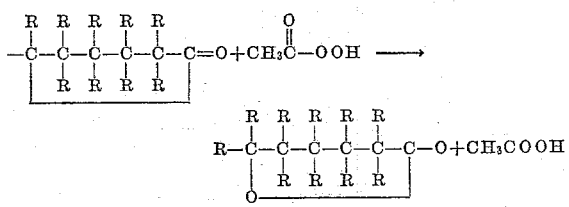

wherein R represents hydrogen atoms and not more than four alkyl groups, and wherein the total of carbon atoms in the alkyl groups does not exceed twelve.

The oxidizing reaction can be carried out between stoichiometric quantities of oxidizing agent and cyclohexanone, but however, the reaction becomes quite slow as the reaction approaches completion, therefore, it is preferred to use an excess of one of the reactants, preferably, cyclohexanone. In carrying out the oxidizing reaction, the oxidizing agents, peracetic acid and acetaldehyde monoperacetate are preferably employed as anhydrous solutions comprising the oxidizing agent and suitable organic solvent such as, acetone, ethyl acetate and the like.

As pointed out hereinbefore, one of the objects of this invention is to provide an epsilon-caprolactone of high purity in substantially monomeric form and which maintains a high degree of stability when stored for various lengths of time at room temperatures. This object, and other objects of the invention are suitably accomplished when the oxidizing reaction, between the cyclohexanone and the oxidizing agent, is carried out under mild conditions and in an environment as free as possible of ionic materials such as strong acids, and under substantially anhydrous conditions.

In carrying out the oxidizing reaction it was discovered that good yields are obtainable when a peracetic acid in acetone solution is added to an excess of cyclohexanone (5 to 1 molar ratio of cyclohexanone to peracetic acid) in a still kettle maintained under reflux at such a pressure as to maintain the temperature of the still kettle at 70° C. Acetone, acetic acid by-product and some cyclohexanone were removed continuously throughout the addition period which was five hours. At the conclusion of the addition period the product lactone was obtained by distillation under reduced pressures in 90 percent yield. Smaller excesses of a cyclohexanone to oxidizing agent can be advantageously employed. For example, an 84.5 percent yield of epsilon-caprolactone was obtained when a solution of peracetic acid in acetone was added to an excess of cyclohexanone (3 to 1 molar ratio) at a temperature of 40° C. under atmospheric pressure. Alternatively, if desired, an excess of oxidizing agent can be advantageously employed. For example, an 87 percent yield of epsilon-caprolactone, based on cyclohexanone, was obtained when a 20 percent excess of peracetic acid was reacted with cyclohexanone at a temperature of 40° C. at atmospheric pressures.

In carrying out the oxidizing reaction subatmospheric, atmospheric or superatmospheric pressures can be employed. The temperature at which the oxidizing reaction can be carried out is not narrowly critical and can vary over a wide range. A preferred operating temperature, however, is a temperature in the range of from 0° C. to 100° C.

The oxidizing agents preferably employed in carrying out the process, and in producing the novel alkyl-substituted epsilon-caprolactones of this invention are described in copending applications Serial No. 303,152 filed August 7, 1952, and Serial No. 394,493 filed November 25, 1953.

The following examples describe processes of the invention involving the production, in part, of the novel alkyl-substituted epsilon-caprolactones in accordance with the invention.

EXAMPLE 1

*Preparation of Epsilon-Caprolactone*

A quantity of a 25.4 percent solution of peracetic acid in acetone corresponding to 2.4 moles of peracetic acid, was added dropwise over a period of 2.3 hours to a still kettle containing 2 moles of cyclohexanone held at 30° C. After an additional two-hour reaction period, the temperature of the reaction mixture was raised to 40° C. and maintained at that temperature for about 7 hours. The reaction mixture was distilled under reduced pressure and afforded 196 grams of epsilon-caprolactone. This corresponded to an 86 percent yield, based on cyclohexanone. The product was characterized by the following physical properties:

Boiling point at 5 mm. Hg _____ 94° C.
Refractive index ($n_D^{30}$) _____ 1.4608
Saponification equivalent (theoretical value for caprolactone—114) _____ 113

EXAMPLE 2

*Preparation of Epsilon-Caprolactone*

A solution of peracetic acid in acetone containing 9 moles of peracetic acid and weighing 2630 grams, was added dropwise to a still kettle containing 11.25 moles of cyclohexanone held at 40° C., with stirring. After an additional reaction period of two hours while the temperature was maintained at 40° C., the reaction mixture was allowed to stand overnight at room temperature. Distillation of the reaction mixture under reduced pressure afforded 810 grams of epsilon-caprolactone. This corresponded to a 79 percent yield based on the peracetic acid. The product was characterized by the following physical properties:

Boiling point at 5 mm. Hg _____ 94° C.
Refractive index ($n_D^{30}$) _____ 1.4608
Saponification equivalent (theoretical value for caprolactone—114) _____ 113

EXAMPLE 3

*Preparation of Epsilon-Caprolactone*

A quantity of a 25.4 percent solution of peracetic acid in acetone corresponding to 9.6 moles of peracetic acid, was added dropwise to a still kettle containing 8 moles of cyclohexanone, while the temperature was maintained at 30° C. After an additional reaction period of two hours at 30° C., the temperature of the reaction mixture was raised to 40° C. for a period of seven hours. Distillation of the reaction mixture under reduced pressure afforded 793 grams of epsilon-carprolactone. This corresponded to an 87 percent yield, based on the cyclohexanone. The product was characterized by the following physical properties:

Boiling point at
  5 mm. Hg _____ 95° C.
  760 mm. Hg _____ 232° C.
Refractive index ($n_D^{30}$) _____ 1.4605
Melting point _____ −2° C.

Specific gravity $\frac{60° F.}{60}$ _____ 1.078

EXAMPLE 4

*Preparation of Epsilon-Caprolactone*

Over a period of 4 hours, 1842 grams of a 24.8 percent solution of peracetic acid (6 moles) in acetone was added dropwise to 1764 grams of cyclohexanone (18 moles) at 40° C. After an additional 3-hour reaction period at 40° C., the reaction mixture was cooled and stored overnight in an ice bath. An analysis for peracetic acid indicated that 96 percent of the theoretical amount of peracetic acid had reacted. The reaction mixture was distilled under vacuum and afforded 577 grams of epsilon-caprolactone. This corresponded to an 84.5 percent yield based on the peracetic acid having the same physical properties as the products from Examples 1, 2, and 3. An additional 7.9 percent of polycaprolactone was obtained as the residue from the distillation.

EXAMPLE 5

*Preparation of Epsilon-Caprolactone*

Cyclohexanone (20 moles) was charged to a still kettle equipped with a packed column containing glass helices and heated under reflux at a pressure of 35 mm. Hg and a kettle temperature at 70° C. Over a period of 4.75 hours, a solution of peracetic acid in acetone (1478 grams) containing 4 moles of peracetic acid was added dropwise to the still kettle at the said temperature and pressure. The acetone and acetic acid were removed continuously at the still head through out the addition period along with some of the cyclohexanone. After the addition was completed, the pressure was reduced, and the remaining reaction mixture was distilled. The distillation afforded 411 grams of epsilon-caprolactone which corresponded to a 90.3 percent yield, based on the peracetic acid. The product from this example, as well as the product from Examples 1 to 4, was stable upon storage at room temperature for long periods of time. No change in the refractive index was observed in the sample after storage at room temperature for 90 days, which indicates that no polymerization had occurred.

EXAMPLE 6

*Preparation of Gamma-Methyl-Epsilon-Caprolactone*

A solution of 420 grams of peracetic acid in acetone containing 1.25 moles of peracetic acid was added dropwise over a period of 40 minutes to 1 mole of 4-methylcyclohexanone at 40° C. After an additional reaction period of 8 hours at the same temperature, an analysis for peracetic acid indicated that 97 percent thereof had been consumed. Vacuum distillation of the reaction mixture gave an 83.7 percent yield of gamma-methyl-epsilon-caprolactone, a colorless liquid boiling at 103° C. at 5 mm. Hg pressure, and having a refractive index of 1.4558 ($n_D^{30}$). The purity, as established by saponification, was substantially 100 percent.

EXAMPLE 7

*Preparation of Epsilon-Methyl-Epsilon-Caprolactone*

Four-hundred and four grams of a 23.6 percent solution of peracetic acid in acetone was fed dropwise over a period of 50 minutes to 112 grams of 2-methylcyclohexanone held at 40° C. After an additional 7 hour reaction period at the same temperature, an analysis for peracetic acid indicated that 98 percent had been consumed. Vacuum distillation of the reaction mixture gave a 91.4 percent yield of epsilon-methyl-epsilon-caprolactone, a colorless liquid boiling at 94° C. at 5 mm. Hg pressure, and having a refractive index of 1.4554–8 ($n_D^{30}$). The purity of the product was 98 percent, calculated as methyl-epsilon-caprolactone from saponification data.

Two products, alpha- and epsilon-methyl-epsilon-caprolactones, are possible from this reaction. However, the product is believed to be essentially epsilon-methyl-epsilon-caprolactone since (1) it gives a positive iodoform test, (2) it has a relatively narrow melting point range (3.8–5.0° C.), (3) an infra-red absorption spectrum of the sodium salt of the corresponding hydroxy acid has a strong secondary alcohol band and very little absorption characteristic of primary alcohols, and (4) the structure is consistent with structures assigned to other products obtained by the reaction of other peracids with unsymmetrical ketones.

EXAMPLE 8

*Preparation of Beta-, Gamma- and Delta-Methyl-Epsilon-Caprolactone*

A starting mixture of 3-methyl- and 4-methyl-cyclohexanones was prepared from a commercial mixture of meta- and para-cresols by hydrogenation to the corresponding methylcyclohexanols, followed by oxidation to the corresponding cyclohexanones.

A 23.4 percent solution of peracetic acid in acetone containing 3.21 moles of peracetic acid was fed dropwise to 2.57 moles of a mixture of 3-methyl and 4-methyl-cyclohexanones over a period of 1 hour at 40° C. The reaction mixture was heated at the same temperature for an additional 10.25 hours. An analysis for peracetic acid indicated that 96 percent of the theoretical amount had been consumed. The reaction mixture was freed of acetic acid by feeding it into a still kettle containing ethylbenzene under reflux and continuously removing as a distillate the azeotrope of ethylbenzene and acetic acid. After removal of the acetic acid, the higher boiling components were fractionated, and there was obtained an 88.5 percent yield of a lactone mixture having a boiling range of 79–80° C. at 2 mm. Hg pressure and a refractive index range of 1.4562–1.4570 ($n_D^{30}$). The purity of the product was substantially 100 percent, calculated as methyl-epsilon-caprolactone from saponification data.

EXAMPLE 9

*Preparation of Epsilon-Caprolactone from Acetaldehyde Monoperacetate*

To 6.25 moles (614 grams) of cyclohexanone refluxing on a 24" x 32 mm. column with a kettle temperature of 70° C. at 30 mm., was added 1.455 moles (370 grams) of a 47.2 percent solution of acetaldehyde monoperacetate in acetone. The addition required 45 minutes. Acetic acid was removed at the head and the distillation was continued until the distillate was relatively free of acetic acid. The material remaining in the kettle was transferred to a smaller column and the distillation continued. A 27 percent yield of epsilon-caprolactone was obtained by fractional distillation under reduced pressure.

EXAMPLE 10

*Preparation of Trimethyl-Epsilon-Caprolactone*

To fifteen moles (2100 grams) of 3,3,5-trimethylcyclohexanone was added five moles (1482 grams) of a 25.6 percent solution of peracetic acid in acetone was stirring at 40° C. The addition required one and one-half hours. The reaction mixture was allowed to heat at 40° C. for an additional eleven hours. A titration for peracetic acid indicated 83.2 percent of the theoretical conversion to trimethyl-epsilon-caprolactone based on peracetic acid used.

The product was isolated by fractional distillation, having a boiling point of 103° C. at 4 mm. Hg pressure and a refractive index of 1.4566 ($n_D^{30}$). The yield was 68 percent. Saponification of the product indicated a purity of substantially 100 percent.

The product is a mixture of beta,beta,delta- and beta-delta,delta-trimethyl-epsilon-caprolactones.

EXAMPLE 11

*Preparation of Beta,Delta-Dimethyl-Epsilon-Caprolactone*

A solution (2,060 grams) of peracetic acid (24.7 percent) in ethyl acetate was added over a two-hour period to 675 grams of 3.5-dimethylcyclohexanone at a temperature of 50° C. After an additional reaction period of 6 hours at 50° C., an analysis for peracetic acid indicated a conversion of 95.5 percent. The reaction mixture was distilled under reduced pressure and there was obtained a 91.5 percent yield (based on the starting ketone) of beta, delta- dimethyl-epsilon-caprolactone, a colorless liquid boiling at 92° C. at 1.5 mm. Hg pressure and having a refractive index of 1.4548 ($n_D^{30}$). The purity, by saponification, was 99 percent.

EXAMPLE 12

*Preparation of Beta,Gamma- and/or Gamma, Delta-Dimethyl-Epsilon-Caprolactone*

A solution (2,622 grams) of peracetic acid (24.4 percent) in ethyl acetate was fed over a four-hour period into 853 grams of 3,4-dimethylcyclohexanone at a temperature of 50° C. The reaction was slightly exothermic and required occasional cooling. After the addition was completed, the reaction mixture was heated for an additional three hours at 50° C. At this time, 98 percent of the theoretical amount of peracetic acid had been consumed. The reaction mixture was distilled rapidly and the high boiling cuts were redistilled with fractionation. There was obtained an 85 percent yield (based on 3,4-dimethylcyclohexanone) of a product having a boiling range of 106–109° C. at 5.0 mm. Hg pressure and having a refractive index range of 1.4577 to 1.4610 ($n_D^{30}$). The purity, as determined by saponification, ranged from 96.5 to 99.3 percent calculated as dimethyl-epsilon-caprolactone, when sampled over the above boiling range. The product is a mixture of beta,gamma- and gamma,delta-dimethyl-epsilon-caprolactones.

EXAMPLE 13

*Preparation of a Dialkyl-Epsilon-Caprolactone Mixture*

To 252 grams of a dialkyl ketone mixture prepared by hydrogenation of a xylenol fraction to the corresponding cyclohexanols followed by oxidation to the corresponding cyclohexanones was added 740 grams of a peracetic acid solution (24.6 percent) in ethyl acetate over a period of 2 hours at 50° C. After heating an additional four hours at 50° C. the reaction mixture was fractionated under reduced pressure. There was obtained a 94.5 percent yield of a dimethyl-epsilon-caprolactone mixture having a boiling range of 95–96° C. at 3 mm. Hg pressure and a refractive index range of 1.4522 to 1.4547 ($n_D^{30}$). The purity, calculated as dimethyl-epsilon-caprolactone, from saponification data was substantially 100 percent.

EXAMPLE 14

*Preparation of Gamma- and Epsilon-(1-Ethyl-1-Methylamyl)-Epsilon Caprolactone*

The ketone used as the starting material in this synthesis was prepared by alkylating phenol with 2-ethylhexanol to give a mixture of 88 percent para-(1-ethyl-1-methylamyl) phenol and 12 percent ortho-(1-ethyl-1-methylamyl) phenol. This mixture was hydrogenated to give the corresponding substituted cyclohexanols and then oxidized with chromic acid to give the corresponding substituted cyclohexanones.

A quantity (210 grams) of the above ketone mixture was heated to 50° C. and 387 grams of a 24.5 percent solution of peracetic acid in ethyl acetate was added dropwise over a period of 50 minutes. The reaction mixture was then heated for 11 hours at the same temperature. At this time, 96 percent of the theoretical amount of peracetic acid had been used. The reaction mixture was diluted with 300 grams of ethylbenzene and the volatile materials were stripped off on a one-plate column. The high-boiling residue was fractionated under reduced pressure to give an 80 percent yield of a mixture of gamma- and epsilon-(1-ethyl-1-methylamyl)-epsilon-caprolactones. This mixture had a boiling range of 132° C. at 1.5 mm. Hg pressure to 153° C. at 1 mm. Hg pressure and a refractive index range of 1.4655 to 1.4760 ($n_D^{30}$). The purity, as judged by saponification, was 97 percent.

What is claimed is:

1. Alkyl-substituted epsilon-caprolactones of the formula:

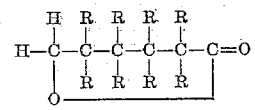

wherein at least one and no more than four of the R's represent alkyl groups, the remainder being hydrogen and wherein the total number of carbon atoms in said alkyl groups does not exceed twelve.

2. Gamma-methyl-epsilon-caprolactone.
3. Beta,delta-dimethyl-epsilon-caprolactone.
4. Beta-methyl-epsilon-caprolactone.
5. Delta-methyl-epsilon-caprolactone.
6. Beta,beta,delta-trimethyl-epsilon-caprolactone.
7. Beta,delta,delta-trimethyl-epsilon-caprolactone.
8. A process for the production of substantially monomeric epsilon-caprolactones which comprises reacting under substantially anhydrous conditions a cyclohexanone selected from the group consisting of cyclohexanone and lower alkyl-substituted cyclohexanones and an oxidizing agent selected from the group consisting of peracetic acid and acetaldehyde monoperacetate and recovering the epsilon-caprolactone thus produced.

9. A process for the production of substantially monomeric epsilon-caprolactones which comprises reacting under substantially anhydrous conditions a cyclohexanone selected from the class consisting of cyclohexanone and lower alkyl-substituted cyclohexanones and peracetic acid and recovering the epsilon-caprolactone thus produced.

10. A process for the production of substantially monomeric epsilon-caprolactones which comprises reacting under substantially anhydrous conditions a cyclohexanone selected from the class consisting of cyclohexanone and lower alkyl-substituted cyclohexanones and acetaldehyde monoperacetate and recovering the epsilon-caprolactone thus produced.

11. A process for the production of substantially monomeric gamma-methyl-epsilon-caprolactone which comprises reacting under substantially anhydrous conditions 4-methyl-cyclohexanone and peracetic acid and recovering gamma-methyl-epsilon-caprolactone.

12. A process for the production of substantially monomeric epsilon-methyl-epsilon-caprolactone which comprises reacting under substantially anhydrous conditions 2-methyl-cyclohexanone and peracetic acid and recovering epsilon-methyl-epsilon-caprolactone.

13. A process for the production of a substantially monomeric trimethyl-epsilon-caprolactone which comprises reacting under substantially anhydrous conditions 3,3,5-trimethyl-cyclohexanone and peracetic acid and recovering the epsilon-caprolactone thus produced.

14. A process for the preparation of substantially monomeric beta-, gamma-, and delta-methyl-epsilon-caprolactones, which comprises reacting a mixture of 3-methyl- and 4-methylcyclohexanones and peracetic acid under substantially anhydrous conditions and recovering the epsilon-caprolactones thus produced.

References Cited in the file of this patent

Klages: Berichte Deut. Chem. Gesell., vol. 32, pages 2566–2567 (1899).

Bayer et al.: Berichte Deut. Chem. Gesell., vol. 33, pages 861–862 (1900).

Van Natta et al.: Jour. Amer. Chem. Soc., vol. 56 (1934), page 455.

Leffler: "Chemical Reviews," vol. 45, pages 385–417 (1949).

Gilman, "Organic Chemistry," vol. IV, pages 1169–1171, Wiley and Sons, New York (1950).

Hudlicky, "Coll. Czeck. Chem. Comuns.," vol. 16, pages 283–295 (1951).

UNITED STATES PATENT OFFICE
CERTIFICATE OF CORRECTION

Patent No. 3,064,008            November 13, 1962

Benjamin Phillips et al.

It is hereby certified that error appears in the above numbered patent requiring correction and that the said Letters Patent should read as corrected below.

Column 2, line 27, for "substitutent" read -- substituent --; column 3, lines 4 to 11, the upper left-hand portion of the formula should appear as shown below instead of as in the patent:

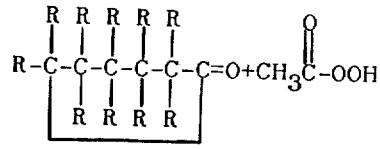

column 6, line 49, for "was" read -- with --; line 68, for "3.5" read -- 3,5 --.

Signed and sealed this 3rd day of September 1963.

(SEAL)
Attest:
ERNEST W. SWIDER
Attesting Officer

DAVID L. LADD
Commissioner of Patents